(12) United States Patent
Huang et al.

(10) Patent No.: US 10,720,829 B1
(45) Date of Patent: Jul. 21, 2020

(54) TOTEM-POLE BRIDGELESS PFC CONVERSION DEVICE AND METHOD OF OPERATING THE SAME

(71) Applicant: Chicony Power Technology Co., Ltd., New Taipei (TW)

(72) Inventors: Wen-Nan Huang, New Taipei (TW); Ching-Guo Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/458,357

(22) Filed: Jul. 1, 2019

(30) Foreign Application Priority Data

Apr. 10, 2019 (TW) ................................ 108112429 A (51) Int. Cl.
*H02M 1/42* (2007.01)
*H02M 1/088* (2006.01)
*H02M 7/04* (2006.01)
*H02M 1/00* (2006.01)

(52) U.S. Cl.
CPC ............. *H02M 1/42* (2013.01); *H02M 1/088* (2013.01); *H02M 7/04* (2013.01); *H02M 2001/0009* (2013.01)

(58) Field of Classification Search
CPC ...... H02M 1/088; H02M 1/42; H02M 1/4208; H02M 1/4225; H02M 1/4233; H02M 7/12; H02M 7/155; H02M 7/162; H02M 7/1623; H02M 7/21; H02M 7/217; H02M 7/219; H02M 3/158
See application file for complete search history.

(56) References Cited

U.S. PATENT DOCUMENTS

| | | | |
|---|---|---|---|
| 6,411,535 B1 | 6/2002 | Roux | |
| 7,630,221 B2 | 12/2009 | Sui et al. | |
| 9,431,896 B2 | 8/2016 | Ye | |
| 9,997,994 B1 | 6/2018 | Luo et al. | |
| 10,122,262 B1 | 11/2018 | Wang et al. | |
| 10,193,437 B1 * | 1/2019 | Hari | H02M 1/4208 |
| 10,630,168 B1 * | 4/2020 | Wang | H02M 1/4208 |

(Continued)

FOREIGN PATENT DOCUMENTS

| | | |
|---|---|---|
| CN | 1864319 A | 11/2006 |
| CN | 101064433 A | 10/2007 |

(Continued)

*Primary Examiner* — Thienvu V Tran
*Assistant Examiner* — Shahzeb K Ahmad
(74) *Attorney, Agent, or Firm* — Muncy, Geissler, Olds & Lowe, P.C.

(57) ABSTRACT

A totem-pole bridgeless PFC conversion device includes a conversion unit, a control unit, a current detecting unit and a phase detecting unit. When the control unit determines that a peak value of an input current is within a predetermined interval between a positive current value and a negative current value based on a current signal of the current detecting unit and a phase signal of the phase detecting unit, the control unit controls the conversion unit to operate in a discontinuous conduction mode (DCM). When the control unit determines that the peak value of the input current is not within the predetermined interval, the control unit controls the conversion unit to operate in a critical conduction mode (CRM).

12 Claims, 4 Drawing Sheets

(56) References Cited

U.S. PATENT DOCUMENTS

| | | | |
|---|---|---|---|
| 2012/0069615 A1* | 3/2012 | Tomioka | H02M 1/4208 |
| | | | 363/126 |
| 2013/0322139 A1* | 12/2013 | Lee | H02M 7/68 |
| | | | 363/84 |
| 2014/0153291 A1* | 6/2014 | Zhang | H05B 45/37 |
| | | | 363/21.01 |
| 2016/0241132 A1* | 8/2016 | Lin | H02M 1/4225 |
| 2018/0062504 A1 | 3/2018 | Mei et al. | |
| 2019/0081571 A1 | 3/2019 | Chung et al. | |
| 2019/0319528 A1* | 10/2019 | Matsuura | H02M 7/219 |

FOREIGN PATENT DOCUMENTS

| | | |
|---|---|---|
| CN | 101151791 A | 3/2008 |
| CN | 101707441 A | 5/2010 |
| CN | 106602896 A | 4/2017 |
| CN | 106706995 A | 5/2017 |
| CN | 107196499 A | 9/2017 |
| JP | 20170384156 A | 2/2017 |
| TW | 201304381 A | 1/2013 |
| TW | I468896 B | 1/2015 |
| TW | 201608805 A | 3/2016 |
| TW | 201804718 A | 2/2018 |

\* cited by examiner

TOTEM-POLE BRIDGELESS PFC CONVERSION DEVICE AND METHOD OF OPERATING THE SAME

BACKGROUND OF THE INVENTION

Technical Field

The present invention relates to a totem-pole bridgeless power factor correction (PFC) conversion device and a method for operating the same, especially to a totem-pole bridgeless PFC conversion device capable of changing operation modes and a method for operating the same.

Description of Related Art

As the progress of power semiconductor and power electronics, the conversion efficiency of power conversion system becomes increasingly important. In current standard, the conversion efficiency of power conversion system needs to be as high as 96% to meet the required standard. Therefore, the power conversion system is preferably to have power factor correction (PFC) function in order to have conversion efficient meeting the required standard.

The conventional power conversion system with PFC function generally comprises PFC unit and DC/DC converter. The PFC unit forces the input current to change with the change of the input voltage such that any load connected to the power conversion system becomes a resistive load, thus enhance the efficiency of the power conversion system. Various power factor correction devices have been developed such as conventional power factor corrector, semi-bridgeless power factor corrector and bidirectional bridgeless power factor corrector. However, in those conventional power factor correction devices, the number of the components used is large and the energy loss of internal element is high. The conventional power factor correction devices have lower efficiency and the cost effectiveness thereof cannot be enhanced.

It is desirable to design a totem-pole bridgeless PFC conversion device and a method for operating the same, where the totem-pole bridgeless PFC conversion device changes the operation mode thereof based on the input current and the phase of the input electric source, thus enhance overall device efficiency.

SUMMARY OF THE INVENTION

It is the object of the present invention to provide a system and method for compensating acceleration of electrical motorbike, where the instantaneous throttle variation rate is detected to provide high-speed response for the output torque and the electrical motorbike has high-efficiency acceleration during short time.

It is an object of the present invention to provide a totem-pole bridgeless PFC conversion device to overcome the above-mentioned problems.

Accordingly, the present invention provides a totem-pole bridgeless power factor correction (PFC) conversion device, comprising: a conversion unit configured to convert an input electric source to an output electric source; a control unit coupled to the conversion unit; a current detecting unit coupled to the input electric source and the control unit, and configured to detect a current signal in the input electric source; and a phase detecting unit coupled to the input electric source and the control unit, and configured to detect a phase signal in the input electric source; wherein the control unit is configured to control the conversion unit to operate in a discontinuous conduction mode (DCM) when the control unit determines, based on the current signal and the phase signal, that a peak value of an input current in the input electric source is within a predetermined interval between a positive current value and a negative current value; wherein the control unit is configured to control the conversion unit to operate in a critical conduction mode (CRM) when the control unit determines that the peak value of the input current is not within the predetermined interval.

Accordingly, the present invention provides a method for operating a totem-pole bridgeless power factor correction (PFC) conversion device, the method comprising: providing a control unit to control a conversion unit to convert an input electric source to an output electric source; the control unit receiving a current signal of the input electric source; the control unit receiving a phase signal of the input electric source; the control unit determines, based on the current signal and the phase signal, whether a peak value of an input current in the input electric source is within a predetermined interval between a positive current value and a negative current value; the control unit controlling the conversion unit to operate in a discontinuous conduction mode (DCM) when the peak value of the input current is within the predetermined interval; the control unit controlling the conversion unit to operate in a critical conduction mode (CRM) when the peak value of the input current is not within the predetermined interval.

BRIEF DESCRIPTION OF DRAWINGS

The present invention can be more fully understood by reading the following detailed description of the embodiment, with reference made to the accompanying drawings as follows.

DETAILED DESCRIPTION OF THE INVENTION

Reference will now be made to the drawing figures to describe the present invention in detail. It will be understood that the drawing figures and exemplified embodiments of present invention are not limited to the details thereof.

Figure 1:
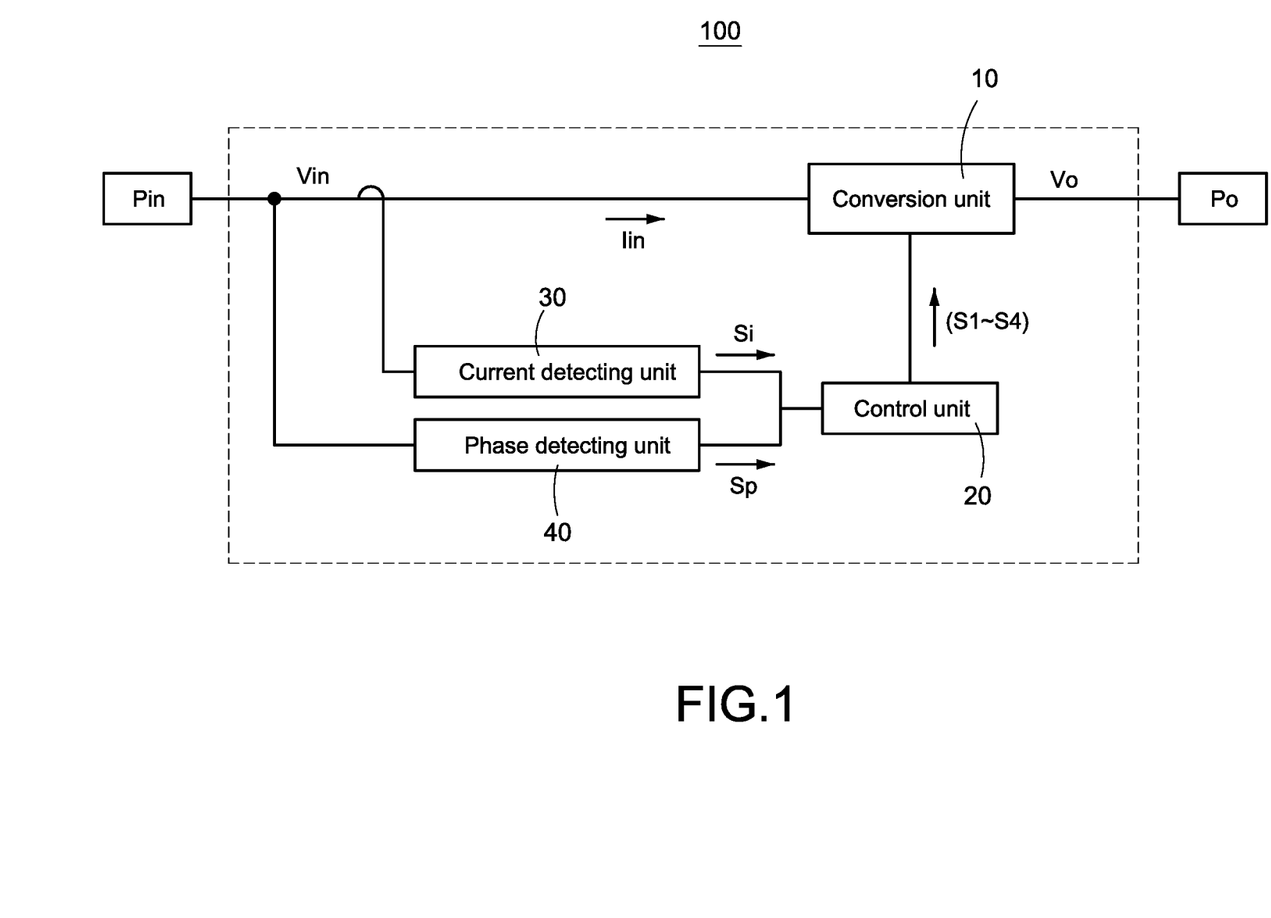
FIG. 1 is the block diagram of the totem-pole bridgeless PFC conversion device.

FIG. 1 is the block diagram of the totem-pole bridgeless PFC conversion device (hereinafter the conversion device 100) according to the present invention. The conversion device 100 receives an input electric source Pin and converts the input electric source Pin into an output electric source Po, which supplies electricity to load (not shown). The conversion device 100 comprises a conversion unit 10, a control unit 20, a current detecting unit 30 and a phase detecting unit 40. The conversion unit 10 is in totem-pole bridgeless topology. The conversion unit 10 receives the input electric source Pin and supplies the output electric source Po to load (not shown). The current detecting unit 30 is coupled to the input of the conversion unit 10 and the control unit 20, and detects the current signal Si in the input electric source Pin. The phase detecting unit 40 is coupled to the input of the conversion unit 10 and the control unit 20, and detects a phase signal Sp in the input electric source Pin.

The control unit 20 is coupled to the conversion unit 10, the current detecting unit 30 and the phase detecting unit 40, and supplies driving signals S1-S4 to the conversion unit based on the current signal Si and the phase signal Sp. The conversion unit 10 converts the input electric source Pin into the output electric source Po based on the driving signals S1-S4. By the control of the driving signals S1-S4, the conversion unit 10 has power correction function; namely, the conversion unit 10 is PFC conversion unit in totem-pole bridgeless topology. It should be noted that the term "electric source" can be referred to as voltage, current or power. The input electric source is generic term for input voltage, input current or input power. However, the input voltage in the present invention is referred to as voltage or voltage value.

More particularly, the control unit 20 determines, based on the current signal Si and the phase signal Sp, whether the peak value of the input current Iin is within a predetermined interval between a positive current value and a negative current value set by the control unit 20. When the control unit 20 determines that the peak value of the input current Iin is within the predetermined interval, the control unit 20 supplies the driving signals S1-S4 to control the conversion unit 10 to operate in discontinuous conduction mode (DCM). When the control unit 20 determines that the peak value of the input current Iin is not within the predetermined interval, the control unit 20 supplies the driving signals S1-S4 to control the conversion unit 10 to operate in critical conduction mode (CRM).

Moreover, the topology of the conversion unit 10 is totem-pole bridgeless converter. The conversion unit 10 has advantages of low circuit loss and high conversion efficiency when the control unit 20 provides PFC control for the conversion unit 10 to operate in CRM. However, the internal power unit (such as switch) of the conversion unit 10 operates in higher frequency region when the conversion unit 10 operates in light load or the input voltage Vin is near the zero-crossing point. Therefore, the loss of the control unit 20 for driving the power unit or the switching loss of the power unit increases. The conversion unit 10 has poor efficiency and EMI performance is degraded when the conversion unit 10 operates in light load or the input voltage Vin is near the zero-crossing point.

It is the object of the present invention to convert the operation mode of the conversion unit 10 by using the control unit 20 to determine the phase of input electric source Pin and the peak value of the input current Iin. When the control unit 20 determines that the peak value of the input current Iin is within the predetermined interval based on the current signal Si and the phase signal Sp, it means the conversion unit 10 operates in light load or the input voltage Vin is near the zero-crossing point. The control unit 20 controls the conversion unit 10 to change operation mode from CRM to DCM to reduce the loss of the control unit 20 for driving the power unit or the switching loss of the power unit, and to enhance the efficiency of the conversion device 100 as well as to improve EMI performance.

Figure 2:
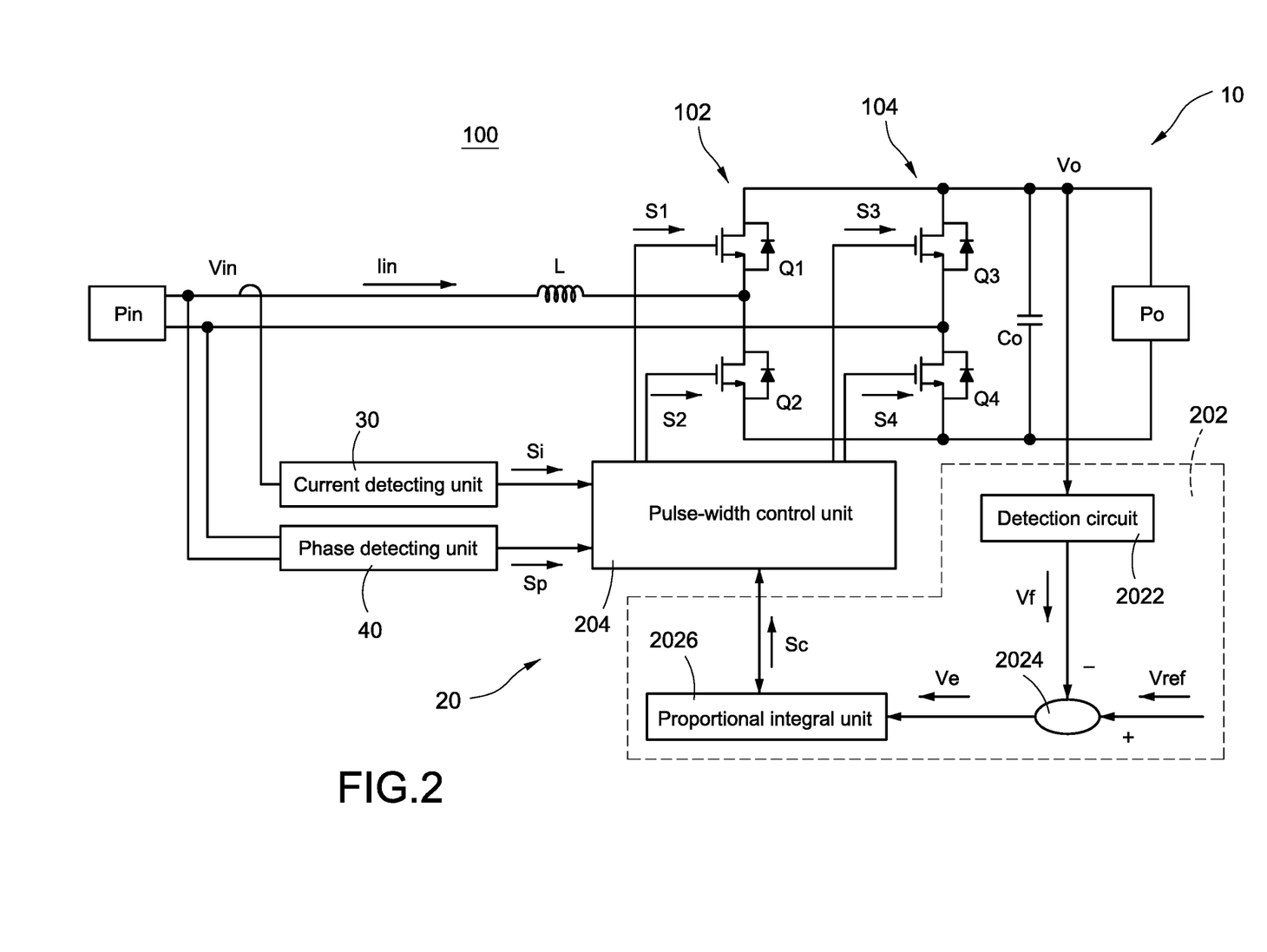
FIG. 2 shows the block diagram of the totem-pole bridgeless PFC conversion device according to the present invention.

FIG. 2 shows the block diagram of the totem-pole bridgeless PFC conversion device 100 according to the present invention. With reference also to FIG. 1, the conversion unit 10 comprises an inductor L, a first bridge arm 102, a second bridge arm 104 and an output capacitor Co. The first bridge arm 102 comprises a first switch Q1 and a second switch Q2 in serial connection. The second bridge arm 104 comprises a third switch Q3 and a fourth switch Q4 in serial connection. One end of the inductor L is coupled to the input electric source Pin and the other end of the inductor L is coupled to the first switch Q1 and the second switch Q2. The second bridge arm 104 is parallel connected with the first bridge arm 102. The third switch Q3 and the fourth switch Q4 are coupled to the input electric source Pin. The output capacitor Co is parallel connected with the second bridge arm 104 and supplies the output electric source Po.

The current detecting unit 30 is coupled to one end of the inductor L and detects the input current Iin flowing to the inductor L, namely the electric current flowing through the inductor L, to supply the current signal Si. One end of the phase detecting unit 40 is coupled to one end of the inductor L and another end of the phase detecting unit 40 is coupled to the third switch Q3 and the fourth switch Q4, namely, the phase detecting unit 40 is coupled to both ends of the input electric source Pin. The phase detecting unit 40 is coupled to both ends of the input electric source Pin to detect the phase of the input electric source Pin and provides the phase signal Sp.

The control unit 20 comprises a feedback control unit 202 and a pulse-width control unit 204. The feedback control unit 202 is coupled to the output capacitor Co and provides the control signal Sc based on the voltage value of the output voltage Vo. The pulse-width control unit 204 is coupled to the switches Q1-Q4, the current detecting unit 30, the phase detecting unit 40 and the feedback control unit 202, and provides the PWM driving signals S1-S4 to respectively control the switches Q1-Q4 based on the current signal Si, the phase signal Sp and the control signal Sc. More particularly, the pulse-width control unit 204 adjusts and stabilizes the voltage value of the output voltage Vo based on the control signal Sc. When the output voltage Vo has variations, the pulse-width control unit 204 provides the PWM driving signals S1-S4 based on the control signal Sc to respectively control the switches Q1-Q4. Through the switching of the switches Q1-Q4, the conversion unit 10 can stabilize the voltage value of the output voltage Vo (namely, stabilize the voltage value stored in the output capacitor Co).

The pulse-width control unit 204 mainly controls the conversion unit 10 to operate in DCM or CRM based on the current signal Si and the phase signal Sp. When the pulse-width control unit 204 determines, based on the current signal Si and the phase signal Sp, that the conversion unit 10 needs to change operation mode, the pulse-width control unit 204 provides the driving signals S1-S4 to respectively control the switches Q1-Q4, thus adjust the duty ratio of energy storing and energy releasing in the inductor L and further control the conversion unit 10 to operate in DCM or CRM. According to one embodiment of the present invention, the pulse-width control unit 204 provides the driving signals S1-S4 based on the current signal Si, the phase signal Sp and the control signal Sc. Therefore, the driving signals S1-S4 provided by the pulse-width control unit 204 enables the conversion unit 10 to stably output the voltage value stored in the output capacitor Co and to operate in DCM or CRM.

With reference back to FIG. 2, the feedback control unit 202 comprises a detection circuit 2022, a comparator 2024 and a proportional integral unit 2026. The detection circuit 2022 is coupled to the output electric source Po. The comparator 2024 is coupled to the detection circuit 2022 and the proportional integral unit 2026, and the proportional integral unit 2026 is coupled to the pulse-width control unit 204. The detection circuit 2022 is for example a voltage division circuit (not shown) and provides feedback voltage Vf to the comparator 2024 based on the voltage value of the output voltage Vo. The comparator 2024 compares the feedback voltage Vf with a reference voltage Vref and provides the voltage difference Ve to the proportional integral unit 2026 based on the difference between the feedback voltage Vf and the reference voltage Vref. The proportional integral unit 2026 receives the voltage difference Ve and provides the control signal Sc to the pulse-width control unit 204 based on the voltage difference Ve.

Moreover, the control unit 20 provides the driving signals S1-S2 to the switches Q1-Q2 mainly for switching control of high frequency energy transfer (the frequency is for example but not limited to 50 kHz), and provides the driving signals S3-S4 to the switches Q3-Q4 mainly for switching control of low frequency phase (the frequency is for example but not limited to 100 Hz). The conversion unit 10 may provide switching control for high frequency energy transfer and low frequency phase by using the switches Q1-Q4 such that the conversion unit 10 may convert the alternating-current input voltage Vin into direct-current output voltage Vo without needing external bride rectifier. For the two switches Q3 and Q4, when the input electric source is in the positive half cycle, only the fourth switch Q4 is turned on; when the input electric source is in the negative half cycle, only the third switch Q3 is turned on. Besides, the switches Q1-Q2 are continually switched during the positive half cycle or the negative half cycle of the input electric source to maintain the stability of the output electric source Po.

More particularly, when the input electric source Pin is in the positive half cycle, the positive half cycle energy storing path of the input electric source Pin for the inductor L is from the input electric source Pin, the inductor L, the second switch Q2 to the fourth switch Q4. When the input electric source Pin is in the positive half cycle, the positive half cycle energy releasing path of the inductor L for the output capacitor Co is from the inductor L, the first switch Q1, the output capacitor Co, the fourth switch Q4 to the input electric source Pin. When the input electric source Pin is in the negative half cycle, the negative half cycle energy storing path of the input electric source Pin for the inductor L is from the input electric source Pin, the third switch Q3, the first switch Q1 to the inductor L. When the input electric source Pin is in the negative half cycle, the negative half cycle energy releasing path of the inductor L for the output capacitor Co is from the inductor L, the input electric source Pin, the third switch Q3, the output capacitor Co to the second switch Q2.

Figure 3:
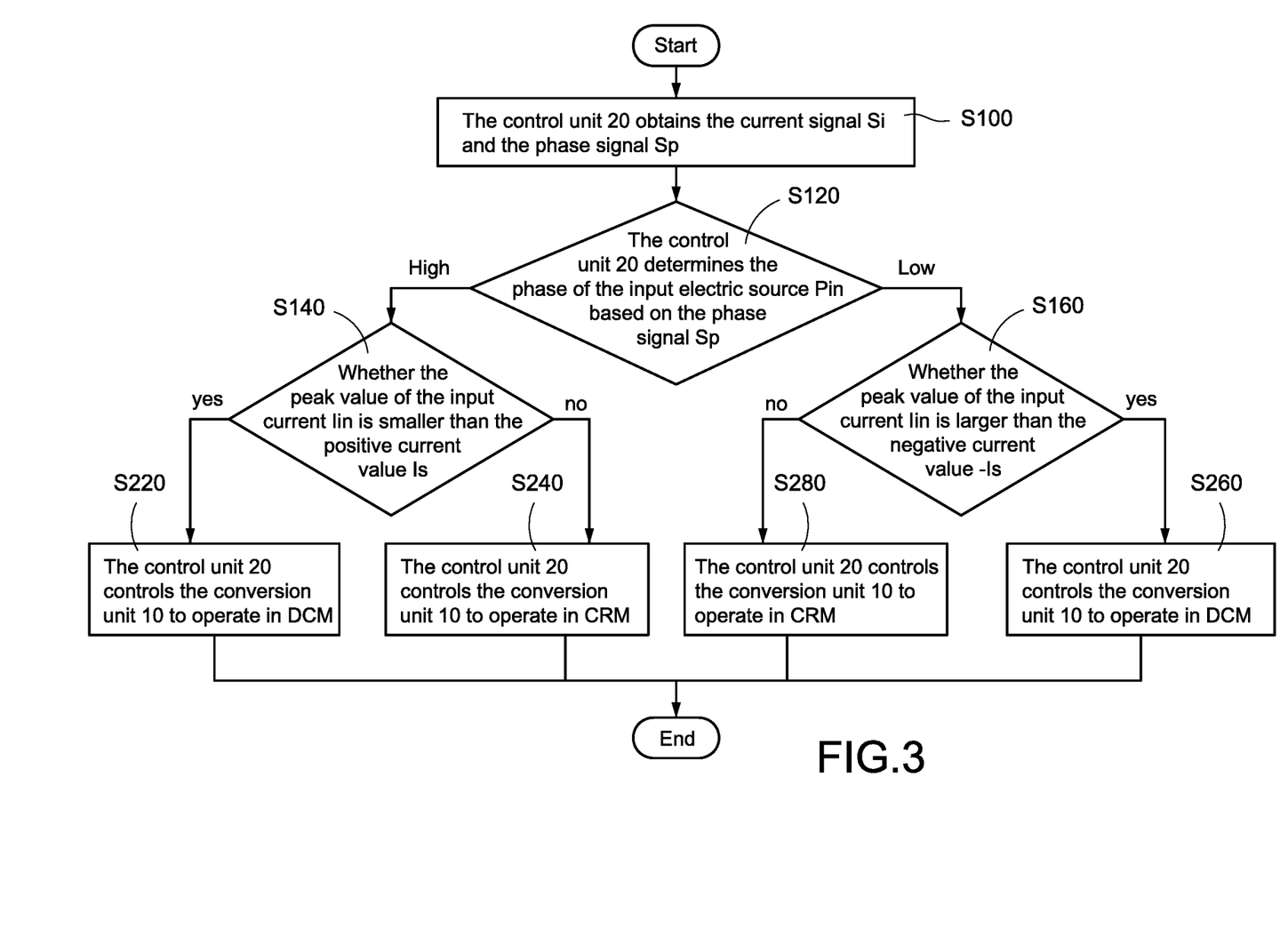
FIG. 3 shows the control flowchart for the totem-pole bridgeless PFC conversion device according to the present invention.

FIG. 3 shows the control flowchart for the totem-pole bridgeless PFC conversion device according to the present invention. With reference also to FIGS. 1 and 2, the control flowchart includes the following steps. The control unit 20 obtains the current signal Si and the phase signal Sp (S100). The control unit 20 determines the phase of the input electric source Pin based on the phase signal Sp (S120). When the control unit 20 determines that the input electric source Pin is in positive half cycle based on the phase signal Sp, the control unit 20 sets the positive current value Is in the positive half cycle. When the control unit 20 determines that the input electric source Pin is in negative half cycle based on the phase signal Sp, the control unit 20 sets the negative current value −Is in the negative half cycle. When the electric source Pin is in positive half cycle, the control unit 20 determines whether the peak value of the input current Iin is smaller than the positive current value Is (S140). When the control unit 20 determines that the value of the input current Iin is smaller than the positive current value Is based on the current signal Si, the control unit 20 controls the conversion unit 10 to operate in DCM (S220). When the control unit 20 determines that the value of the input current Iin is larger than or equal to the positive current value Is based on the current signal Si, the control unit 20 controls the conversion unit 10 to operate in CRM (S240).

Finally, when the input electric source Pin is in negative half cycle, the control unit 20 determines whether the peak value of the input current Iin is larger than the negative current value −Is (S160). When the control unit 20 determines that the value of the input current Iin is larger the negative current value −Is based on the current signal Si, the control unit 20 controls the conversion unit 10 to operate in DCM (S260). When the control unit 20 determines that the value of the input current Iin is smaller than or equal to the negative current value −Is based on the current signal Si, the control unit 20 controls the conversion unit 10 to operate in CRM (S280). It should be noted that according to one embodiment, the absolute values of the positive current value Is and the negative current value −Is set by the control unit 20 can be equal. But the scope of the present invention is not limited by the above example. Any setting of the positive current value Is and the negative current value −Is should be within the scope of the present invention as long as the loss of the control unit 20 for driving the power unit or the switching loss (namely switches Q1-Q4) of the power unit that can be reduced.

Figure 4:
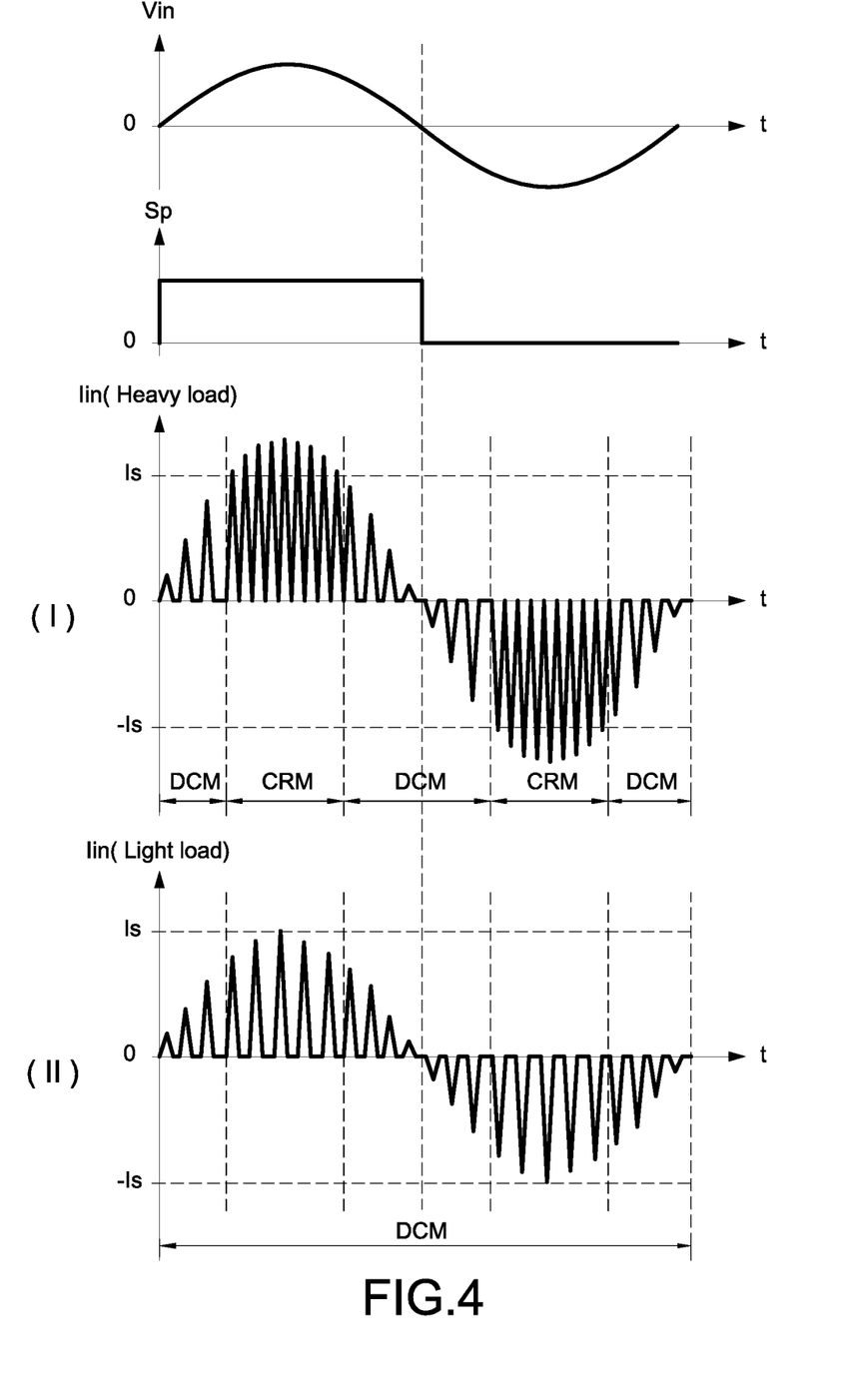
FIG. 4 shows the waveform of the totem-pole bridgeless PFC conversion device according to the present invention.

FIG. 4 shows the waveform of the totem-pole bridgeless PFC conversion device according to the present invention. With reference also to FIGS. 1-3, the input voltage Vin is sinusoidal alternating-current voltage, and has positive half cycle and negative half cycle. When the input voltage Vin is in positive half cycle, the phase signal Sp detected by the phase detecting unit 40 is positive square wave; when the input voltage Vin is in negative half cycle, the phase signal Sp detected by the phase detecting unit 40 is negative square wave. The control unit 20 determines that the input electric source Pin is in positive half cycle or negative half cycle based on the phase signal Sp. The control unit 20 sets the positive current value Is in positive half cycle and sets the negative current value −Is in negative half cycle. Afterward, the control unit 20 determines whether the peak value of the input current Iin is within the predetermined interval between the positive current value Is and the negative current value −Is.

As shown in FIG. 4, the waveform I indicates the waveform of the input current Iin when the conversion unit 10 is in heavy load. When the peak value of the input current Iin is within the predetermined interval between the positive current value Is and the negative current value −Is, it means that the input voltage Vin is near the zero-crossing point. At this time, the control unit 20 controls the conversion unit 10 to operate in DCM.

When the peak value of the input current Iin is not within the predetermined interval between the positive current value Is and the negative current value −Is, it means that the input voltage Vin is not near the zero-crossing point. At this time, the control unit 20 controls the conversion unit 10 to operate in CRM.

The waveform II indicates the waveform of the input current Iin when the conversion unit 10 is in light load. At this time, the peak value of the input current Iin is smaller than that in heavy load because the conversion unit 10 is in light load. Therefore, the peak value of the input current Iin remains within the predetermined interval between the positive current value Is and the negative current value −Is. Namely, the control unit 20 controls the conversion unit 10 to operate in DCM when the conversion unit 10 is in light load.

As shown in FIG. 4, it should be noted that in CRM the control unit 20 instantaneously controls the input electric source Pin to store energy in the inductor L when the input current Iin (namely the electric current flowing through the inductor L) is zero. Therefore, the energy of the input current Iin can be instantaneously stored to generate the next triangular wave (current) when the input current Iin reaches zero point. Therefore, the two adjacent triangular waves have no separation in CRM. In DCM, when the input current Iin (namely the electric current flowing through the inductor L) is zero, the control unit 20 controls the input electric source Pin to store energy in the inductor L only if the voltage value of the output voltage Vo is lower than a threshold value set by the control unit 20. Therefore, after the energy of the inductor L is released out, the control unit 20 waits for the energy of the output capacitor Co to be lower than the threshold value set by the control unit 20 and then controls the input electric source Pin to store energy in the inductor L to generate the next triangular wave. Accordingly, the two adjacent triangular waves have a small separation in DCM.

To sum up, the present invention has following advantages and effects:

1. The present invention uses control unit to determine the positive phase/negative phase of the input electric source and the peak value of the input current, and then control the mode conversion for the conversion unit. The loss of the control unit for driving the power unit or the switching loss of the power unit can be reduced. The efficiency of the conversion device and EMI performance can be enhanced.
2. The control unit controls the mode conversion for the conversion unit simply based on phase determination and setting positive current value/the negative current value. The control is easy and the possibility of erroneous control due to erroneous determination can be reduced.
3. The conversion unit uses the first switch and the second switch for high frequency energy conversion and controls the third switch and the fourth switch for low frequency phase switching. The conversion unit does not need additional bridge rectifier and still can convert the alternating-current input voltage to direct-current output voltage.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A totem-pole bridgeless power factor correction (PFC) conversion device, comprising:
    a conversion unit configured to convert an input electric source to an output electric source;
    a control unit coupled to the conversion unit;
    a current detecting unit coupled to the input electric source and the control unit, and configured to detect a current signal in the input electric source; and
    a phase detecting unit coupled to the input electric source and the control unit, and configured to detect a phase signal in the input electric source;
    wherein when the control unit determines that the input electric source is in a positive half cycle based on the phase signal, the control unit determines whether a peak value of an input current is greater than or equal to a positive current value in the positive half cycle; when the control unit determines that the input electric source is in a negative half cycle based on the phase signal, the control unit determines whether the peak value of the input current is less than or equal to a negative current value in the negative half cycle;
    wherein the control unit is configured to control the conversion unit to operate in a discontinuous conduction mode (DCM) when the control unit determines, based on the current signal and the phase signal, that the peak value of the input current in the input electric source is within a predetermined interval between the positive current value and the negative current value, and the conversion unit operates in a light load condition or the input electric source is near a zero-crossing point;
    wherein the control unit is configured to control the conversion unit to operate in a critical conduction mode (CRM) when the control unit determines that the peak value of the input current is not within the predetermined interval, and the conversion unit operates in a heavy load condition and the input electric source is not near the zero-crossing point.

2. The totem-pole bridgeless PFC conversion device in claim 1, wherein an absolute value of the positive current value is equal to an absolute value of the negative current value.

3. The totem-pole bridgeless PFC conversion device in claim 1, wherein the control unit comprises:
    a feedback control unit coupled to the output electric source and configured to detect the output electric source; and
    a pulse-width control unit coupled to the conversion unit, the current detecting unit, the phase detecting unit and the feedback control unit;
    wherein the feedback control unit is configured to provide a control signal to the pulse-width control unit based on the output electric source; the pulse-width control unit is configured to control the conversion unit to stabilize a voltage value of the output electric source based on the control signal; and the pulse-width control unit is configured to control the conversion unit to operate in the DCM or the CRM based on the current signal and the phase signal.

4. The totem-pole bridgeless PFC conversion device in claim 3, wherein the feedback control unit comprises:
    a detection circuit coupled to the output electric source;
    a comparator coupled to the detection circuit; and
    a proportional integral unit coupled to the comparator and the pulse-width control unit;
    wherein the detection circuit is configured to provide a feedback voltage to the comparator based on the output electric source; the comparator compares the feedback voltage with a reference voltage to provide a voltage difference; and the proportional integral unit provides the control signal to the pulse-width control unit based on the voltage difference.

5. The totem-pole bridgeless PFC conversion device in claim 1, wherein the conversion unit comprises:
    an inductor coupled to the input electric source;
    a first bridge arm comprising a first switch and a second switch in serial connection, wherein the first switch and the second switch are coupled to the inductor;
    a second bridge arm parallel connected with the first bridge arm and comprising a third switch and a fourth switch in serial connection, wherein the third switch and the fourth switch are coupled to output electric source; and an output capacitor parallel connected with the second bridge arm and providing the output electric source;

wherein the control unit is configured to output a plurality of driving signals to control the first switch, the second switch, the third switch and the fourth switch for controlling the conversion unit to convert the input electric source into the output electric source.

6. The totem-pole bridgeless PFC conversion device in claim 5, wherein in the CRM, the control unit is configured to control the input electric source to store energy in the inductor when the input current is zero; in the DCM, the control unit is configured to control the input electric source to store energy in the inductor when the input current is zero and a voltage value of the output electric source is lower than a threshold value.

7. The totem-pole bridgeless PFC conversion device in claim 5, wherein when the input electric source is in the positive half cycle, the input electric source stores energy in inductor through a positive half cycle energy-storing path, the -positive half cycle energy-storing path is from the input electric source, the inductor, the second switch, and the fourth switch;

when the input electric source is in the positive half cycle, the inductor releases energy to the output capacitor through a positive half cycle energy-releasing path, the positive half cycle energy-releasing path is from the inductor, the first switch, the output capacitor, the fourth switch and the input electric source.

8. The totem-pole bridgeless PFC conversion device in claim 5, wherein when the input electric source is in the negative half cycle, the input electric source stores energy in inductor through a negative half cycle energy-storing path, the- negative half cycle energy-storing path is from the inductor, the input electric source, the third switch, and the first switch;

when the input electric source is in the negative half cycle, the inductor releases energy to the output capacitor through a negative half cycle energy-releasing path, the negative half cycle energy-releasing path is from the inductor, the input electric source, the third switch, the output capacitor, and the second switch.

9. A method for operating a totem-pole bridgeless power factor correction (PFC) conversion device, the method comprising:

providing a control unit to control a conversion unit to convert an input electric source to an output electric source;

the control unit receiving a current signal of the input electric source;

the control unit receiving a phase signal of the input electric source, and determining whether the input electric source is in a positive half cycle or a negative half cycle based on the phase signal;

the control unit determining whether a peak value of an input current is greater than or equal to a positive current value in the positive half cycle when the input electric source is in the positive half cycle; and the control unit determining whether the peak value of the input current is less than or equal to a negative current value in the negative half cycle when the input electric source is in the negative half cycle;

the control unit determines, based on the current signal and the phase signal, whether the peak value of the input current in the input electric source is within a predetermined interval between the positive current value and the negative current value;

the control unit controlling the conversion unit to operate in a discontinuous conduction mode (DCM) when the peak value of the input current is within the predetermined interval, and the conversion unit operates in a light load condition or the input power is near a zero-crossing point;

the control unit controlling the conversion unit to operate in a critical conduction mode (CRM) when the peak value of the input current is not within the predetermined interval, and the conversion unit operates in a heavy load condition and the input electric source is not near the zero-crossing point.

10. The method in claim 9, further comprising:

the control unit controlling the conversion unit to stabilize a voltage value of the output electric source based on a control signal corresponding to the output electric source.

11. The method in claim 9, wherein an absolute value of the positive current value is equal to an absolute value of the negative current value.

12. The method in claim 9, wherein during the CRM, the control unit controls the input electric source to store energy in an inductor when the input current is zero; during the DCM, the control unit controls the input electric source to store energy in the inductor when the input current is zero and a voltage value of the output electric source is lower than a threshold value.

* * * * *